United States Patent
Shahoian et al.

(10) Patent No.: US 7,209,118 B2
(45) Date of Patent: Apr. 24, 2007

(54) INCREASING FORCE TRANSMISSIBILITY FOR TACTILE FEEDBACK INTERFACE DEVICES

(75) Inventors: Erik J. Shahoian, San Ramon, CA (US); Kenneth M. Martin, Palo Alto, CA (US)

(73) Assignee: Immersion Corporation, San Jose, CA (US)

( * ) Notice: Subject to any disclaimer, the term of this patent is extended or adjusted under 35 U.S.C. 154(b) by 633 days.

(21) Appl. No.: 10/759,028

(22) Filed: Jan. 20, 2004

(65) Prior Publication Data

US 2004/0147318 A1 Jul. 29, 2004

Related U.S. Application Data

(63) Continuation of application No. 09/675,995, filed on Sep. 29, 2000, now Pat. No. 6,680,729.

(60) Provisional application No. 60/157,206, filed on Sep. 30, 1999.

(51) Int. Cl.
*G09G 5/00* (2006.01)
(52) U.S. Cl. .......................... 345/156; 463/36
(58) Field of Classification Search ................ 345/156, 345/157, 158, 161, 162; 463/36, 37, 38
See application file for complete search history.

(56) References Cited

U.S. PATENT DOCUMENTS

| | | | |
|---|---|---|---|
| 2,972,140 A | 2/1961 | Hirsch | |
| 3,157,853 A | 11/1964 | Hirsch | |
| 3,220,121 A | 11/1965 | Cutler | |
| 3,497,668 A | 2/1970 | Hirsch | |
| 3,517,446 A | 6/1970 | Corlyon et al. | |
| 3,623,064 A | 11/1971 | Kagan | |
| 3,902,687 A | 9/1975 | Hightower | |
| 3,903,614 A | 9/1975 | Diamond et al. | |

(Continued)

FOREIGN PATENT DOCUMENTS

| | | |
|---|---|---|
| EP | 0 349 086 | 1/1990 |
| JP | H2-185278 | 7/1990 |
| JP | H4-8381 | 1/1992 |
| JP | H5-192449 | 8/1993 |
| JP | H7-24147 | 1/1995 |

OTHER PUBLICATIONS

Aukstakalnis et al., "Silicon Mirage: The Art and Science of Virtual Reality," ISBN 0-938151-82-7, pp. 129-180, 1992.

(Continued)

*Primary Examiner*—Richard Hjerpe
*Assistant Examiner*—Jeaqn Lesperance
(74) *Attorney, Agent, or Firm*—Thelen Reid Brown Raysman & Steiner LLP; David B. Ritchie

(57) ABSTRACT

Method and apparatus for increasing the transmissibility of inertial forces produced by an inertial actuator on the housing of a tactile feedback interface device. A tactile interface device, coupled to a host computer, outputs tactile sensations to a user based on interactions and events occurring in a displayed graphical environment. An actuator produces periodic inertial forces, such as vibrations, and a compliant suspension couples the actuator to the device housing. A compliance of the suspension is selected such that the suspension magnifies the periodic inertial forces for a particular frequency range of the inertial forces. The magnified inertial forces are transmitted to the housing to be felt by the user.

28 Claims, 7 Drawing Sheets

U.S. PATENT DOCUMENTS

| | | | |
|---|---|---|---|
| 3,911,416 | A | 10/1975 | Feder |
| 4,127,752 | A | 11/1978 | Lowthorp |
| 4,160,508 | A | 7/1979 | Salisbury, Jr. |
| 4,236,325 | A | 12/1980 | Hall et al. |
| 4,262,549 | A | 4/1981 | Schwellenbach |
| 4,333,070 | A | 6/1982 | Barnes |
| 4,464,117 | A | 8/1984 | Foerst |
| 4,484,191 | A | 11/1984 | Vavra |
| 4,513,235 | A | 4/1985 | Acklam et al. |
| 4,581,491 | A | 4/1986 | Boothroyd |
| 4,599,070 | A | 7/1986 | Hladky et al. |
| 4,708,656 | A | 11/1987 | de Vries et al. |
| 4,713,007 | A | 12/1987 | Alban |
| 4,794,392 | A | 12/1988 | Selinko |
| 4,885,565 | A | 12/1989 | Embach |
| 4,891,764 | A | 1/1990 | McIntosh |
| 4,930,770 | A | 6/1990 | Baker |
| 4,934,694 | A | 6/1990 | McIntosh |
| 5,019,761 | A | 5/1991 | Kraft |
| 5,022,384 | A | 6/1991 | Freels |
| 5,022,407 | A | 6/1991 | Horch et al. |
| 5,035,242 | A | 7/1991 | Franklin et al. |
| 5,038,089 | A | 8/1991 | Szakaly |
| 5,078,152 | A | 1/1992 | Bond et al. |
| 5,165,897 | A | 11/1992 | Johnson |
| 5,175,459 | A | 12/1992 | Danial et al. |
| 5,186,695 | A | 2/1993 | Mangseth et al. |
| 5,212,473 | A | 5/1993 | Louis |
| 5,240,417 | A | 8/1993 | Smithson et al. |
| 5,271,290 | A | 12/1993 | Fischer |
| 5,275,174 | A | 1/1994 | Cook |
| 5,283,970 | A | 2/1994 | Aigner |
| 5,299,810 | A | 4/1994 | Pierce et al. |
| 5,309,140 | A | 5/1994 | Everett, Jr. et al. |
| 5,334,027 | A | 8/1994 | Wherlock |
| 5,436,622 | A | 7/1995 | Gutman et al. |
| 5,437,607 | A | 8/1995 | Taylor |
| 5,466,213 | A | 11/1995 | Hogan et al. |
| 5,547,382 | A | 8/1996 | Yamasaki et al. |
| 5,575,761 | A | 11/1996 | Hajianpour |
| 5,650,704 | A | 7/1997 | Pratt et al. |
| 5,690,582 | A | 11/1997 | Ulrich et al. |
| 5,766,016 | A | 6/1998 | Sinclair et al. |
| 5,785,630 | A | 7/1998 | Bobick et al. |
| 5,973,678 | A | 10/1999 | Stewart et al. |
| 6,020,875 | A | 2/2000 | Moore et al. |
| 6,088,017 | A | 7/2000 | Tremblay et al. |
| 6,111,577 | A | 8/2000 | Zilles et al. |
| 6,147,674 | A | 11/2000 | Rosenberg et al. |
| 6,160,489 | A | 12/2000 | Perry et al. |
| 6,171,191 | B1 * | 1/2001 | Ogata et al. .................. 463/38 |
| 6,275,213 | B1 | 8/2001 | Tremblay et al. |
| 6,422,941 | B1 | 7/2002 | Thorner et al. |
| 6,424,333 | B1 | 7/2002 | Tremblay et al. |
| 6,468,158 | B1 | 10/2002 | Ootori et al. |

OTHER PUBLICATIONS

Bliss, "Optical-to-Tactile Image Conversion for the Blind," IEEE Transactions on Man-Machine Systems, vol. MMS-11, No. 1, pp. 58-65, Mar. 1970.

Calder, "Design of A Force-Feedback Touch-Introducing Actuator For Teleoperator Robot Control," Bachelor of Science Thesis, MIT, Jun. 23, 1983.

"Cyberman Technical Specification," Logitech Cyberman SWIFT Supplement, Apr. 5, 1994.

Eberhardt et al., "Inducing Dynamic Haptic Perception by The Hand: System Description and Some Results," DSC-vol. 55-1, Dynamic Systems and Control: vol. 1, ASME 1994, pp. 345-351.

Gobel et al., "Tactile Feedback Applied to Computer Mice," International Journal of Human-Computer Interaction, vol. 7, No. 1, pp. 1-24, 1995.

Johnson, "Shape-Memory Alloy Tactile Feedback Actuator," Armstrong Aerospace Medical Research Laboratory, AAMRL-TR-90-039, Aug. 1990.

Kaczmarek et al., "Tactile Displays," Virtual Environment Technologies, pp. 349-414.

Kontarinis et al., "Tactile Display of Vibratory Information in Teleoperation and Virtual Environments," PRESENCE, vol. 4, No. 4, pp. 387-402, 1995.

Lake, "Cyberman from Logitech," GameBytes, 1994.

Noll, "Man-Machine Tactile," SID Journal, Jul./Aug. 1972 Issue.

Ouhyoung et al., "The Development of A Low-Cost Force Feedback Joystick and Its Use in the Virtual Reality Environment," Proceedings of the Third Pacific Conference on Computer Graphics and Applications, Pacific Graphics '95, Seoul, Korea, Aug. 21-24, 1995, pp. 309-319.

Pimentel et al., "Virtual Reality: through the new looking glass," $2^{nd}$ Edition; McGraw-Hill, ISBN 0-07-050167-X, pp. 41-202, 1994.

Patrick, "Design, Construction, and Testing of a Fingertip Tactile Display for Interaction with Virtual and Remote Environments," Master of Science Thesis, MIT, Nov. 8, 1990.

"Component Maintenance Manual With Illustrated Parts List, Coaxial Control Shaker Part No. C-25502," Safe Flight Instrument Corporation, Revised Jan. 28, 2002 (3 pages).

"Technical Manual Overhaul Instructions With Parts Breakdown, Coaxial Control Shaker Part No. C-25502," Safe Flight Instrument Corporation, Revised Jul. 15, 1980 (23 pages).

Scannell, "Taking a Joystick Ride," Computer Currents, Boston Edition, vol. 9, No. 11, Nov. 1994.

Baigrie, "Electric Control Loading—A Low Cost, High Performance Alternative," *Proceedings of Interservice/Industry Training Systems Conference*, pp. 247-254, Nov. 6-8, 1990.

Iwata, "Pen-based Haptic Virtual Environment," 0-7803-1363-1/93 IEEE, pp. 287-292, 1993.

Russo, "The Design and Implementation of a Three Degree of Freedom Force Output Joystick," *MIT Libraries Archives* pp. 1-131, May 1990, archived Aug. 14, 1990.

Brooks et al., "Hand Controllers for Teleoperation—A State-of-the-Art Technology Survey and Evaluation," *JPL Publication 85-11*, NASA-CR-175890; N85-28559, pp. I-84, Mar. 1, 1985.

Jones et al., "A perceptual analysis of stiffness," ISSN 0014-4819 Springer International (Springer-Verlag); *Experimental Brain Research*, vol. 79, No. 1, pp. 150-156, 1990.

Burdea et al., "Distributed Virtual Force Feedback, Lecture Notes for Workshop on Force Display in Virtual Environments and its Application to Robotic Teleoperation," *1993 IEEE International Conference on Robotics and Automation*, pp. 25-44, May 2, 1993.

Snow et al., Model-X Force-Reflecting-Hand-Controller, NT Control No. NPO-17851; JPL Case No. 7348, pp. 1-4 with 45 pages of attachments, Jun. 15, 1989.

Ouh-Young, "Force Display in Molecular Docking," Doctoral Dissertation, University of North Carolina at Chapel Hill, UMI Order No. 9034744, p. 1-369, 1990.

Tadros, "Control System Design for a Three Degree of Freedom Virtual Environment Simulator Using Motor/Brake Pair Actuators," *MIT Archive*, pp. 1-88, Feb. 1990, archived Aug. 13, 1990.

Caldwell et al., "Enhanced Tactile Feedback (Tele-Taction) Using a Multi-Functional Sensory System," 1050-4729/93, pp. 955-960, 1993.

Adelstein et al., "Design and Implementation of a Force Reflecting Manipulandum for Manual Control research," DSC-vol. 42, *Advances in Robotics*, pp. 1-12, 1992.

Gotow et al., "Controlled Impedance Test Apparatus for Studying Human Interpretation of Kinesthetic Feedback," WA11-11:00, pp. 332-337.

Stanley et al., "Computer Simulation of Interacting Dynamic Mechanical Systems Using Distributed Memory Parallel Processors," DSC-vol. 42,*Advances in Robotics*, pp. 55-61, ASME 1992.

Russo, "Controlling Dissipative Magnetic Particle Brakes in Force Reflective Devices," DSC-vol. 42, *Advances in Robotics*, pp. 63-70, ASME 1992.

Kontarinis et al., "Display of High-Frequency Tactile Information to Teleoperators," *Telemanipulator Technology and Space Telerobotics*, Won S. Kim, Editor, Proc. SPIE vol. 2057, pp. 40-50, Sep. 7-9, 1993.

Patrick et al., "Design and Testing of A Non-reactive, Fingertip, Tactile Display for Interaction with Remote Environments," *Cooperative Intelligent Robotics in Space*, Rui J. deFigueiredo et al, Editor, Proc. SPIE vol. 1387, pp. 215-222, 1990.

Adelstein, "A Virtual Environment System For The Study of Human Arm Tremor," *Ph.D. Dissertation*, Dept. of Mechanical Engineering, MIT, Jun. 1989, archived Mar. 13, 1990.

Bejczy, "Sensors, Controls, and Man-Machine Interface for Advanced Teleoperation," *Science*, vol. 208, No. 4450, pp. 1327-1335, 1980.

Bejczy et al., "Generalization of Bilateral Force-Reflecting Control of Manipulators," *Proceedings Of Fourth CISM-IFToMM*, Sep. 8-12, 1981.

McAffee et al., "Teleoperator Subsystem/Telerobot Demonstrator: Force Reflecting Hand Controller Equipment Manual," *JPL* 1988, JPL D-5172.

Minsky, "Computational Haptics: The Sandpaper System for Synthesizing Texture for a Force-Feedback Display," *Ph.D. Dissertation*, MIT, Jun. 1995, archived Jul. 6, 1995.

Jacobsen et al., "High Performance, Dextrous Telerobotic Manipulator With Force Reflection," *Intervention/ROV '91 Conference & Exposition*, Hollywood, Florida, May 21-23, 1991.

Shimoga, "Finger Force and Touch Feedback Issues in Dexterous Telemanipulation," *Proceedings of Fourth Annual Conference on Intelligent Robotic Systems for Space Exploration*, Rensselaer Polytechnic Institute, Sep. 30-Oct. 1, 1992.

IBM Technical Disclosure Bulletin, "Mouse Ball-Actuating Device With Force and Tactile Feedback," vol. 32, No. 9B, Feb. 1990.

Terry et al., "Tactile Feedback In A Computer Mouse," *Proceedings of Fourteenth Annual Northeast Bioengineering Conference, University of New Hampshire*, Mar. 10-11, 1988.

Howe, "A Force-Reflecting Teleoperated Hand System for the Study of Tactile Sensing in Precision Manipulation," *Proceedings of the 1992 IEEE International Conference on Robotics and Automation*, Nice, France, May 1992.

Eberhardt et al., "OMAR—A Haptic display for speech perception by deaf and deaf-blind individuals," *IEEE Virtual Reality Annual International Symposium*, Seattle, WA, Sep. 18-22, 1993.

Rabinowitz et al., "Multidimensional tactile displays: Identification of vibratory intensity, frequency, and contractor area," *Journal of The Acoustical Society of America*, vol. 82, No. 4, Oct. 1987.

Bejczy et al., "Kinesthetic Coupling Between Operator and Remote Manipulator," *International Computer Technology Conference, The American Society of Mechanical Engineers*, San Francisco, CA, Aug. 12-15, 1980.

Bejczy et al., "A Laboratory Breadboard System For Dual-Arm Teleoperation," *SOAR '89 Workshop, JSC*, Houston, TX, Jul. 25-27, 1989.

Ouhyoung et al., "A Low-Cost Force Feedback Joystick and Its Use in PC Video Games," *IEEE Transactions on Consumer Electronics*, vol. 41, No. 3, Aug. 1995.

Marcus, "Touch Feedback in Surgery," *Proceedings of Virtual Reality and Medicine The Cutting Edge*, Sep. 8-11, 1994.

Bejczy, et al., "Universal Computer Control System (UCCS) For Space Telerobots," CH2413-3/87/0000/0318501.00 1987 IEEE, 1987.

Wiker, "Teletouch Display Development: Phase 1 Report," *Technical Report 1230*, Naval Ocean Systems Center, San Diego, Jul. 1988.

Yamakita et al., "Tele-Virtual Reality of Dynamic Mechanical Model," *Proceedings of the 1992 IEEE/RSJ International Conference on Intelligent Robots and Systems*, Raleigh, NC, Jul. 7-10, 1992.

Rosenberg, "Virtual Fixtures: Perceptual Overlays Enhance Operator Performance In Telepresence Tasks," *Ph.D. Dissertation*, Stanford University, Jun. 1994.

* cited by examiner

INCREASING FORCE TRANSMISSIBILITY FOR TACTILE FEEDBACK INTERFACE DEVICES

CROSS REFERENCE TO RELATED APPLICATIONS

This application is a continuation of U.S. application Ser. No. 09/675,995, filed on Sep. 29, 2000, now U.S. Pat. No. 6,680,729 entitled "Increasing Force Transmissibility for Tactile Feedback Interface Devices" and also claims the benefit of Provisional Patent Application No. 60/157,206, filed Sep. 30, 1999 by Shahoian et al., entitled "Increasing Vibration Transmissibility in Vibrotactile Controllers by Tuning Suspension Compliance," each of which is incorporated herein by reference in their entirety.

BACKGROUND OF THE INVENTION

The present invention relates generally to tactile feedback human-computer interface devices, and more specifically to enhancing inertial tactile feedback in such interface devices.

Computer devices are widely used for entertainment activities such as playing games. Currently, popular gaming computer devices include game consoles connected to a home television set, such as the Nintendo® 64 from Nintendo Corp., the Playstation® from Sony Corp. and the Dreamcast™ from Sega Corp. Gaming computer devices also include personal computers, such as Windows PCs, Macintosh computers, and others. Also, portable computer devices are often used for entertainment purposes, such as Game Boy® from Nintendo, personal digital assistants such as PalmPilot® from Palm Computing, and laptop computers.

Users of these computer devices typically interact with a game or other application program using an interface device connected to the host computer (e.g. game console). Such interface devices may include joysticks, gamepads, mice, trackballs, styluses, steering wheels, or other devices. A user moves a user manipulatable object (manipulandum), such as a joystick, wheel, mouse, button, dial, or other object, which is sensed by the host computer and used to manipulate a graphical environment displayed by the host computer. Recently, haptic feedback in interface devices has become available as well, where the host computer and/or a microprocessor on the interface device controls one or more motors to output forces to the user. These forces are correlated with events or objects in the graphical environment to further immerse the user in the gaining experience or interface task. Herein, the term "haptic feedback" is intended to include both tactile (or vibrotactile) feedback (forces transmitted to user skin surfaces) and kinesthetic feedback (forces provided in degree(s) of freedom of motion of the manipulandum).

In the game console market, products are typically produced in high volume and low cost. Therefore, haptic feedback interface devices have been typically limited to simpler embodiments that provide more limited forms of haptic feedback. Existing force feedback "gamepad" controllers (or add-on hardware for gamepad controllers) that are used to interface with games running on game consoles include the Dual Shock™ from Sony Corp., the Rumble Pak™ from Nintendo Corp., and the Jump Pack from Sega Corp, as well as other types of handheld controllers such as the MadCatz Dual Force Racing Wheel. These devices are inertial tactile feedback controllers which employ one or more motors to shake the housing of the controller and thus provide output forces such as vibrations to the user which are correlated to game events and interactions. Typically, an eccentric rotating mass (ERM) motor, i.e., pager motor, is used to generate vibration on the controller and thus to the user. The motor is rigidly coupled to the controller housing and provides a mass on a rotating shaft offset from the axis of rotation, so that when the shaft is rotated, the inertial forces from the moving mass rock the motor and the gamepad housing back and forth.

One problem with existing tactile controllers is that they are limited in the magnitude of forces output to the user. Devices driving a motor and mass in only one rotational direction tend to provide greater amplitude forces in an inertial tactile device, but the forces are not as crisp, precise, or controllable as forces output by a harmonically (bidirectional) driven motor and mass. The drawback of the harmonically-driven mass, or low power tactile devices, is that the forces are often not strong enough to be compelling to the user, especially in applications such as games or virtual reality.

SUMMARY OF THE INVENTION

The present invention is directed to increasing the transmissibility of inertial forces produced by an inertial actuator on the housing of a tactile feedback interface device.

More specifically, a tactile interface device of the present invention is coupled to a host computer, the interface device outputting tactile sensations to a user based on interactions and events occurring in a graphical environment displayed by the host computer. The interface device includes a housing physically contacted by a user operating the device, an actuator producing periodic inertial forces, such as vibrations, when the actuator is activated by a control signal, and a compliant suspension coupling the actuator to the housing. A compliance of the suspension is selected such that the suspension magnifies the periodic inertial forces for a particular frequency range of the inertial forces. The magnified inertial forces are transmitted to the housing to be felt by the user. The compliance can be predetermined to set a resonance frequency of the system including the actuator, suspension and housing at a frequency within the desired operating frequency range for the periodic inertial forces.

The compliant suspension can include in some embodiments at least one spring member, such as a leaf spring, diaphragm, or spring beams integrated with the housing of the interface device. A damping member, such as foam, oil, etc. can also be coupled between the actuator and housing to reduce a peak magnitude of the output forces. The host computer can be a video game console, where the graphical environment is a game, and where the periodic inertial forces are correlated with events and interactions in the game. The motor can be a rotary motor with an eccentric mass coupled to its rotating shaft, or an actuator that moves oscillates an inertial mass linearly.

The present invention advantageously allows the output of increased magnitude inertial forces such as vibrations to the housing of an interface device without having to increase the power to the actuators causing the forces. This increase in inertial force magnitude allows harmonically-driven inertial masses to be more effective at producing compelling tactile sensations to a user of the interface device, and allows all inertial tactile devices to be more efficient in delivering tactile sensations.

These and other advantages of the present invention will become apparent to those skilled in the art upon a reading of the following specification of the invention and a study of the several figures of the drawing.

DETAILED DESCRIPTION OF THE PREFERRED EMBODIMENTS

This application describes techniques and devices that provide increased force transmissibility and thus output magnitude for inertial forces produced by inertial tactile devices. Herein, the term "tactile device" or "tactile feedback device" is intended to refer to any controller or interface device that outputs inertial forces, such as pulses or vibrations, to the user of the device by moving an inertial mass, and can include gamepads, handheld steering wheels, fishing-type controllers, joysticks, mice, trackballs, adult devices, grips, remote controls, handheld game devices, flat screens, styluses, etc.

Figure 1:
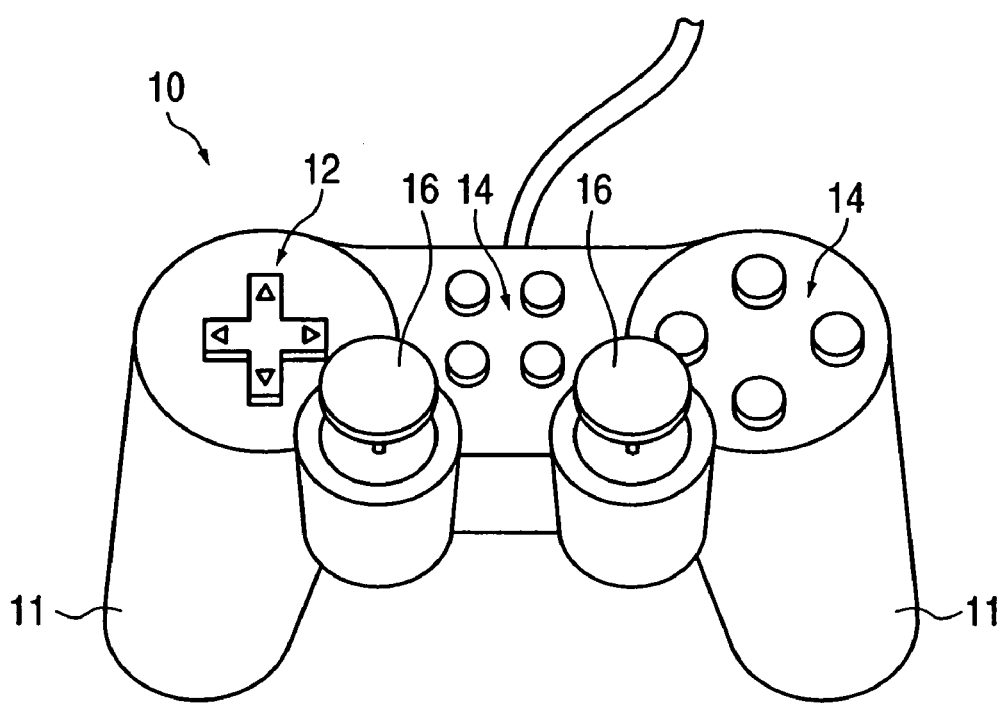
FIG. 1 is a perspective view of an example gamepad interface device suitable for use with the present invention.

FIG. 1 is a perspective view of a gamepad controller 10 which is suitable for use with the present invention. Controller 10 is preferably connected to a host computer, such as a game console unit, personal computer, or other device, as described below. Controller 10 can include a direction pad ("d-pad") 12 for directional user input, buttons 14 for button user input, and/or one or more joysticks 16 for directional user input. Controller 10 also includes one or more actuators integrated with the housing of the controller, as explained below with reference to FIG. 2. The user grasps both grips 11 while operating the controller to feel vibrations through the housing of the controller. For example, gamepad controllers for use with console gaming systems, such as those available from Sony, Nintendo, or Sega, can be modified for use with the present invention.

Figure 2:
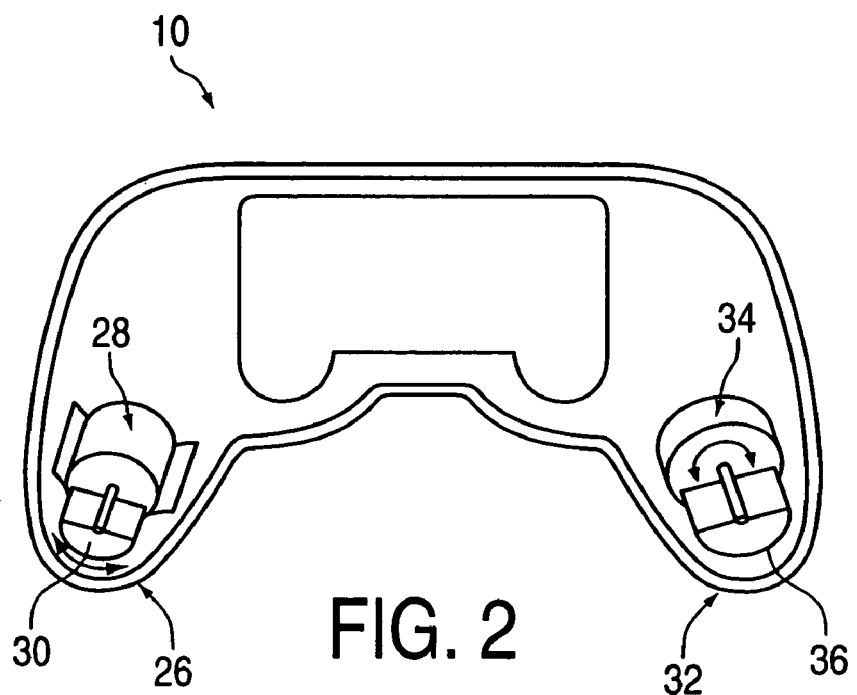
FIG. 2 is a top plan cross sectional view of the gamepad of FIG. 1.

An example of a sectional view of controller 10 is shown in FIG. 2. Controller 10 includes one or more individual actuators 28 and 34, such as motors. In one embodiment, each motor can have an eccentric rotating mass (ERM). The ERM is an inertial mass that is rotated to output inertial forces on the gamepad housing with respect to the inertial mass (acting as an inertial ground) rather than outputting forces with respect to an earth ground. By rotating the mass continuously, periodic inertial forces are output at a particular frequency to cause force sensations such as vibrations on the housing. Single pulses of inertial force can be output by moving an inertial mass for only one cycle, or for a very small number of cycles at a high frequency (which tends to work more effectively in harmonically-driven actuators, described below).

For example, in one grip 26 of the controller a small rotary D.C. motor 28 can be provided which includes a small mass 30 coupled to its rotating shaft. In the other grip 32, a large rotary motor 34 can be provided which includes a large mass 36 coupled to its rotating shaft. Each motor can be activated to rotate its associated mass to provide inertial forces on the housing of the device 10. In some embodiments, the large motor 34 can be activated to display larger amplitudes or lower frequencies of periodic inertial forces to the user, and the small motor 28 can be activated to convey higher frequencies or smaller amplitude periodic inertial forces to the user. In other embodiments, the actuators 28 and 34 can be the same size and output forces of the same magnitude ad frequency. A range of rotation speeds can preferably be commanded; or, in some embodiments, the voltage to one or both of the motors can be specified as on or off to only allow a single frequency and magnitude of output vibration. One or both of the motors can be activated at any one time to provide a variety of tactile effects. Individual games on the host console unit control when the motors are turned on and off by sending commands or signals to the controllers to correlate tactile feedback with game events.

In its most direct operation, the ERM can be rotated in only one direction at a desired frequency to produce a vibration at that frequency. Each output frequency has a magnitude associated with it, so that high frequency vibrations tend to have higher magnitudes than low frequency vibrations. Alternatively, control techniques can be used to independently control magnitude and frequency of vibrations output by an ERM driven in only one direction. For example, a pulse can be applied each period of the sine wave to cause oscillations at a desired frequency and magnitude. Several of these techniques are disclosed in copending application Ser. No. 09/669,029, filed Sep. 25, 2000, entitled, "Controlling Haptic Sensations for Vibrotactile Feedback Interface Devices", and incorporated herein by reference.

In other embodiments, the ERM's of the motors can be driven harmonically. For example, bi-directional amplifiers can be included to oscillate an ERM to provide periodic inertial forces, and a forcing function such as a sine wave is used to control the oscillation. In many embodiments, this allows more crisp and higher bandwidth vibrations to be output. Furthermore, the magnitude and frequency of the vibrations can be independently controlled more directly by simply altering the control waveform. Harmonic operation of a rotating mass is described in greater detail in copending application Ser. No. 09/608,125, filed Jul. 1, 2000, and entitled, "Controlling Vibrotactile Sensations for Haptic Feedback Devices", and is incorporated herein by reference. A problem with this bi-directional control method is that the oscillatory control and motion of the rotating mass requires more power than driving the motor in one direction. Often, only a limited amount of power is available to drive the motors in a gamepad or other handheld controller, so that the maximum vibration magnitude is often a lower magnitude than is desired for many inertial tactile feedback sensations. The present invention, however, provides greater magnitude vibrations that allows a harmonic system to be much more effective, as described below.

Other embodiments can include other types of actuators or actuator assemblies. For example, an actuator assembly providing linear inertial forces is described in copending patent application Ser. No. 09/585,741, filed Jun. 2, 2000, entitled, "Haptic Interface Device and Actuator Assembly Providing Linear Haptic Sensations," which is incorporated herein by reference. This actuator assembly linearly oscillates an inertial mass, which can be a separate mass or an actuator itself, by providing a harmonic drive signal. Other harmonic and other types of actuator assemblies which can be used to provide inertial tactile sensations in accordance with the present invention are described in copending applications Ser. Nos. 09/967,494, filed Sep. 27, 2000, entitled "Providing Directional Tactile Feedback and Actuator for Providing Tactile Sensations"; 60/263,558, filed Sep. 28, 2000, entitled "Device and Assembly for Providing Linear Inertial Sensations," and 60/236,897, filed Sep. 28, 2000, entitled "Directional Inertial Tactile Feedback Using Rotating Masses", all incorporated herein by reference.

In alternate embodiments, other types of interface devices can be used with the present invention, such as gamepads, handheld or surface-grounded steering wheels, fishing-type controllers, joysticks, mice, trackballs, adult devices, grips, remote controls, handheld game devices, flat screens, styluses, etc.

Figure 3:
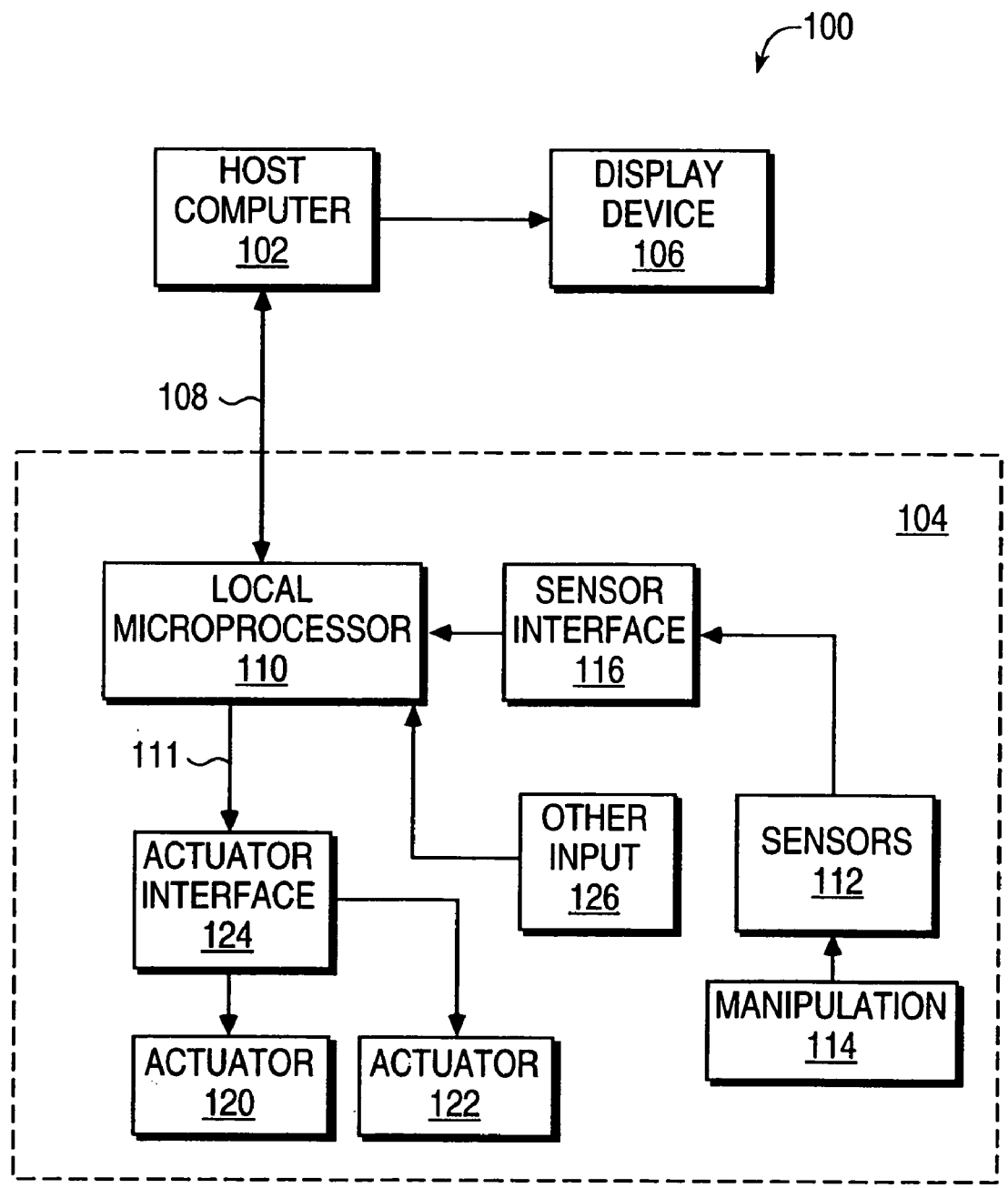
FIG. 3 is a block diagram illustrating a tactile feedback system suitable for use with the present invention.

FIG. 3 is a block diagram illustrating a haptic system 100 suitable for use with the present invention. System 100 includes a host computer 102 and an interface device 104.

Host computer 102 is any of a variety of computing or electronic devices. In one preferred embodiment, computer 102 is a personal computer, game console, or workstation, such as a PC compatible computer or Macintosh personal computer, or game console system from Nintendo Corp., Sega Corp., Sony Corp., or Microsoft Corp. In other embodiments, host computer 102 can be a "set top box" which can be used, for example, to provide interactive television functions to users, or a "network-" or "internet-computer" which allows users to interact with a local or global network using standard connections and protocols such as used for the Internet and World Wide Web. Some embodiments may provide a host computer 102 within the same casing or housing as the interface device or manipulandum that is held or contacted by the user, e.g. hand-held video game units, portable computers, arcade game machines, etc. Host computer preferably includes a host microprocessor, random access memory (RAM), read only memory (ROM), input/output (I/O) circuitry, an audio output device, and other components of computer devices well-known to those skilled in the art. Other types of peripherals can also be coupled to host computer 102, such as storage devices (hard disk drive, CD ROM drive, floppy disk drive, memory cards, communication devices, etc.), printers, and other input and output devices.

A visual display device 106 is preferably connected or part of the computer 102 and displays visual images of a graphical environment, such as a game environment, operating system application, simulation, etc. Display device 106 can be any of a variety of types of devices, such as LCD displays, LED displays, CRT's, flat panel screens, display goggles, etc.

Host computer 102 preferably implements a host application program with which a user is interacting via the interface device 104 and other peripherals, if appropriate. For example, the host application program can be a video game, word processor or spreadsheet, Web page or browser that implements HTML or VRML instructions, scientific analysis program, virtual reality training program or application, or other application program that utilizes input of device 104 and outputs haptic feedback commands to the device 104 (or a different layer can output such commands, such as an API or driver program on the host). The host program checks for input signals received from the electronics and sensors of device 104, and outputs force values and/or commands to be converted into forces output for device 104. Suitable software drivers which interface such simulation software with computer input/output (I/O) devices are available from Immersion Corporation of San Jose, Calif.

Several different layers of programs can be running on the host computer 102. For example, at an application layer, one or more application programs can be running, such as a game program, word processing program, etc. Several sub-layers can also be provided, such as an Application Programming Interface (API) layer (e.g. used in Windows OS from Microsoft. Corp.), and different driver layers. The application program can command forces directly, or a driver program can monitor interactions within an application program and command haptic effects when predetermined conditions are met. In one embodiment, a haptic feedback driver program can receive kinesthetic haptic commands from an application program and can map the commands to inertial tactile commands and effects, and then send the necessary information to the interface device 104.

Interface device 104 is coupled to host computer 102 by a bi-directional bus 108. The bi-directional bus sends signals in either direction between host computer 102 and the interface device. For example, bus 108 can be a serial interface bus, such as an RS232 serial interface, RS-422, Universal Serial Bus (USB), MIDI, or other protocols well known to those skilled in the art; or a parallel bus or wireless link. For example, the USB standard provides a relatively high speed interface that can also provide power to actuators of device 104.

Interface device 104 can, in many embodiments, include a local microprocessor 110. Local microprocessor 110 can optionally be included within the housing of device 104 to allow efficient communication with other components of the device. Processor 110 is considered local to device 104, where "local" herein refers to processor 110 being a separate microprocessor from any processors in host computer 102. "Local" also preferably refers to processor 110 being dedicated to haptic feedback and sensor I/O of device 104. Microprocessor 110 can be provided with software instructions to wait for commands or requests from host 102, decode or parse the command or request, and handle/control input and output signals according to the command or request. In some embodiments, processor 110 can operate independently of host computer 102 by reading sensor signals and calculating appropriate forces from those sensor signals, time signals, and stored or relayed instructions selected in accordance with a high level host command. Suitable microprocessors for use as local microprocessor 110 include the MC68HC711E9 by Motorola, the PIC16C74 by Microchip, and the 82930AX by Intel Corp., for example, as well as more sophisticated force feedback processors such as the Immersion Touchsense™ Processor, current versions of which are used with personal computers such as PC's. Microprocessor 110 can include one microprocessor chip, multiple processors and/or co-processor chips, and/or digital signal processor (DSP) capability. For example, the control techniques described for the present invention can be implemented within firmware of an Immersion TouchSense Processor, where the local microprocessor block 110 includes related components, such as encoder processing circuitry, communication circuitry, and PWM circuitry as well as a microprocessor. Various techniques for playing more sophisticated periodics and other sensations (such as defined by Immersion protocols) with a eccentric rotating mass (ERM) motor can be provided in the firmware of the microprocessor 110.

Microprocessor 110 can receive signals from sensors 112 and provide signals to actuators 120 and 122 in accordance with instructions provided by host computer 102 over bus 108. The microprocessor 110 can provide a control signal 111 to the actuators. In one embodiment, the control signal is a PWM signal the firmware of processor 110 can generate and send to the amplifier in actuator interface 124. There is preferably one control signal per actuator., In one local control embodiment, host computer 102 provides high level supervisory commands to microprocessor 110 over bus 108, and microprocessor 110 decodes the commands and manages low level force control loops to sensors and the actuator in accordance with the high level commands and independently of the host computer 102. This operation is described in greater detail in U.S. Pat. Nos. 5,739,811 and 5,734,373, both incorporated by reference herein. In the host control loop, force commands are output from the host computer to microprocessor 110 and instruct the microprocessor to output a force or force sensation having specified characteristics. The local microprocessor 110 reports data to the host computer, such as locative data that describes the position of the mouse in one or more provided degrees of freedom. The data can also describe the states of buttons or other devices of device 104. The host computer uses the data to update executed programs. In the local control loop, actuator signals are provided from the microprocessor 110 to the actuators and sensor signals are provided from the sensors 112 and other input devices to the microprocessor 110. The microprocessor 110 can process inputted sensor signals to determine appropriate output actuator control signals by following stored instructions. The microprocessor may use sensor signals in the local determination of forces to be output, as well as reporting locative data derived from the sensor signals to the host computer.

In yet other embodiments, other hardware can be provided locally to device 104 to provide functionality similar to microprocessor 110. For example, a hardware state machine incorporating fixed logic can be used to provide signals to the actuators and receive sensor signals from sensors 112, and to output tactile signals according to a predefined sequence, algorithm, or process. Techniques for implementing logic with desired functions in hardware are well known to those skilled in the art. Such hardware can be well suited to less complex force feedback devices, such as the device of the present invention.

In a different, host-controlled embodiment, host computer 102 can provide low-level force commands over bus 108, which are directly transmitted to the actuator via microprocessor 110 or other circuitry (if no microprocessor 110 is present). Host computer 102 thus directly controls and processes all signals to and from the device 104, e.g. the host computer directly controls the forces output by actuator 120 or 122 and directly receives sensor signals from sensor 112 and input devices 126. This embodiment may be desirable to reduce the cost of the force feedback device yet further, since no complex local microprocessor 110 or other processing circuitry need be included in the device 104. The host 102 can also stream force values that are sent to the actuators, as described in U.S. Pat. No. 5,959,613, incorporated herein by reference.

In the simplest host control embodiment, the signal from the host to the device can be a single bit that indicates whether to pulse the actuator at a predefined frequency and magnitude. In more complex embodiments, the signal from the host can include a magnitude, giving the strength of the desired pulse, and/or a frequency. A local processor can also be used to receive a simple command from the host that indicates a desired force value to apply over time, so that the microprocessor outputs the force value for the specified time period based on the one command. The host command may also specify an "envelope" to provide on a force output to allow force shaping, as disclosed in U.S. Pat. No. 5,959,613, incorporated herein by reference. A combination of numerous methods described above can also be used for a single device 104.

Local memory, such as RAM and/or ROM, can be coupled to microprocessor 110 in device 104 to store instructions for microprocessor 110 and store temporary and other data. In addition, a local clock can be coupled to the microprocessor 110 to provide timing data, which might be required, for example, to compute forces output by actuator. In embodiments using the USB communication interface, timing data for microprocessor 110 can be alternatively retrieved from the USB signal.

Sensors 112 sense the position or motion of a manipulandum 114 (such as a joystick 16) of the device 104 and provides signals to microprocessor 110 (or host 102) including information representative of the position or motion. In some embodiments, the manipulandum is one or more small joysticks provided on a gamepad controller and moved by a user in two rotary or linear degrees of freedom to provide control input to the host computer. The manipulandum can also be a direction pad having four or more directions which can provide input to the host computer. The manipulandum can also be a rotary dial, linear slider, wheel, finger receptacle, cylinder, or other controlling member. The manipulandum can also be the housing of the device itself, as in the case of a mouse or if sensing the position of a gamepad or other controller in 3-D space. Sensors suitable for detecting motion of a joystick or other manipulandum include digital optical encoders frictionally coupled to a rotating ball or cylinder, as is well known to those skilled in the art. Mechanical switches, linear optical encoders, potentiometers, optical sensors, velocity sensors, acceleration sensors, strain gauges, or other types of sensors can also be used, and either relative or absolute sensors can be provided. Optional sensor interface 116 can be used to convert sensor signals to signals that can be interpreted by the microprocessor 110 and/or host computer 102, as is well known to those skilled in the art.

Actuators 120 and 122 transmit inertial forces to the user of the device 104 in response to signals or commands received from microprocessor 110 and/or host computer 102. In one described embodiment, two or more actuators are provided; other embodiments, only one actuator is provided. In one embodiment, the actuators are eccentric rotating mass (ERM) DC motors, which are rotary motors having an eccentric mass coupled to the rotating shaft of the motor. When rotated, the inertial forces from the rotating mass cause an oscillation or vibration in the housing or other member coupled to the motor housing, thus producing tactile sensations to the user who is holding or otherwise contacting the housing.

Alternate embodiments can employ a single actuator, or two or more actuators of the same or differing sizes for providing inertial sensations or forces to the user of the device 104. Many different types of actuators can be used, e.g. any type of actuator which can move an inertial mass, such as voice coil actuators, moving magnet actuators, hydraulic or pneumatic actuators, torquers, brushed or brushless motors, etc. Furthermore, additional actuators can be included to provide kinesthetic force feedback in the manipulandum 114. Linear actuators or actuator assemblies of all types may also be used, in which an inertial mass or rotor is linearly oscillated to provide vibrations.

Actuator interface 124 can be optionally connected between actuators 120 and 122 and microprocessor 110 to convert signals from microprocessor 110 into signals appropriate to drive the actuators. Interface 124 can include power amplifiers, switches, digital to analog controllers (DACs), analog to digital controllers (ADCs), and other components, as is well known to those skilled in the art. For example, in one embodiment the actuators 120 and 122 are off-the-shelf ERM motors which are driven unidirectionally. Uni-directional voltage mode amplifiers are low cost components that can be used in actuator interface 124 to drive the motors. In bi-directional embodiments, appropriate amplifiers and other components may be used.

Other input devices 118 are included in device 104 and send input signals to microprocessor 110 or to host 102 when manipulated by the user. Such input devices can include buttons, dials, switches, scroll wheels, or other controls or mechanisms. Power supply 120 can optionally be included in or coupled to device 104, and can be coupled to actuator interface 124 and/or actuators 120 and 122 to provide electrical power to the actuators. Alternatively, and more preferably, power can be drawn from the bus 108, e.g. using a USB or other bus. Also, received power can be stored and regulated by device 104 and thus used when needed to drive actuators 120 and 122 or used in a supplementary fashion. Because of the limited power supply capabilities of USB, a power storage device may be required in the mouse device to ensure that peak forces can be applied (as described in U.S. Pat. No. 5,929,607, incorporated herein by reference). For example, power can be stored over time in a capacitor or battery and then immediately dissipated to output a haptic sensation. Alternatively, this technology can be employed in a wireless device 104 which communicates with the host computer 102 via wireless signals, and in which case battery power can be used to drive the actuators.

Increasing Force Transmissibility

The tactile feedback embodiments above can greatly benefit from any design that allows the inertial force output to be increased. A harmonic drive embodiment, for example, uses more power than the unidirectional embodiments and thus cannot output as high a magnitude of inertial forces such as vibrations. And although the unidirectional embodiments use less power than the bi-directional method of control, providing inertial forces having the same magnitude at less power is a valuable advantage, and may be necessary in some circumstances where insufficient power is available to convey realistic force sensations.

A mass that provides the needed inertial reaction forces tends to fight the control signal at higher frequencies. For a harmonically driven rotational inertia, a given motor's torque requirement as a function of frequency is:

$$T_m(\omega) = -m_e r^2 \omega^2 \sin(\omega t)$$

where $T_m = J\alpha$, $J = m_e r^2$ and $\alpha = -\omega^2 \sin(\omega t)$ and where T is the motor torque, $m_e$ is the eccentric mass, r is the eccentricity of the mass (distance from the center of rotation to the center of mass), $\omega$ is the frequency, and t is time. For flat acceleration response, the torque requirement for the motor rises with frequency squared. For any mass, eccentricity of the mass, or torque constant, this relationship ultimately holds.

The motors in currently-available tactile feedback products are simply hard-mounted to the plastic case or held in a molded pocket feature with a highly-compressed piece of polyurethane foam (which offers little or no additional compressibility) to prevent the actuator from rattling. This tightly couples motor frame reaction forces to the plastic housing, effectively adding mass to the motor. For a harmonically-driven system, the dynamics model for this situation looks like a mass driven with a forcing function coupled with a very high stiffness to the mass of the housing. The mass is almost a single mass comprised of the housing and motor driven by a sinusoidal forcing function. The highest force transmitted is the maximum motor frame reaction force which is given by:

$$F_{radial} = m_e r_e \omega^2$$

Note that there is almost no compliance provided between the motor frame and the device housing, i.e., any coupling spring between the motor frame and the housing is very stiff. Thus, the system looks like a single harmonically driven mass. The motor must be driven harder as the frequency is increased. The transmitted force magnitude falls off at −40 dB/decade.

According to the present invention, the motor/mass can be coupled to the housing by a compliant or flexible member, connection, or material instead of being tightly mounted to the housing as in existing devices. By mounting the motor mass in such a compliant suspension which has been tuned with consideration of the mass of the housing and the desired frequency response, the vibration force felt by the user in the housing can effectively be magnified.

Figure 4:
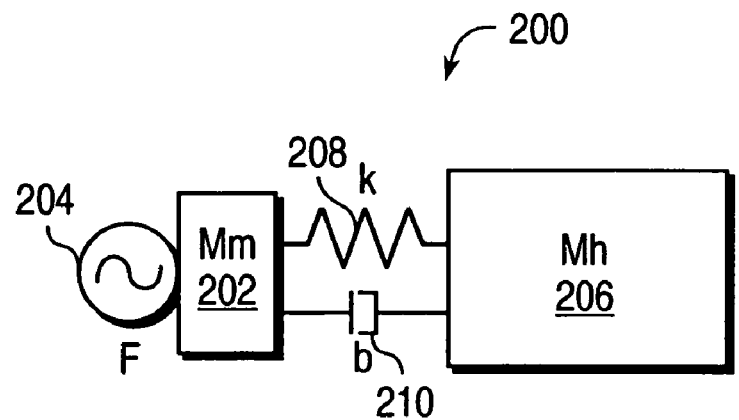
FIG. 4 is a schematic diagram illustrating an inertial tactile feedback system of the present invention.

FIG. 4 is a block diagram 200 illustrating an inertial tactile feedback system of the present invention for magnifying inertial force output. A motor mass (Mm) 202 indicates the mass of the motor, including housing and other components, as well as a moving mass such as an ERM. A sinusoidal forcing function drives the moving mass of the motor mass 202 in harmonic operation (in the described embodiment) and is indicated by source 204. A large mass (Mh) 206 is preferably the housing or a portion of the housing of the interface device 104. A spring 208 indicates a compliance provided between the motor mass 202 and the large mass 206, and has a spring constant K. A damper 210 can also be included in some embodiments between the motor mass 202 and the large mass 206.

The two degree of freedom mechanical system (2 masses can move independently) undamped model for the embodiment of FIG. 4 is:

$$F = [m_h/m_m + m_h](P_o/(\omega^2/\omega_n^2) - 1 \text{ where } \omega_n \text{ is given by:}$$

$$\omega_n = [k/(m_h m_m/m_h + m_m)]^{1/2}$$

where k is the spring constant, $P_o$ is the peak radial force from the eccentric mass given by $F_{radial} = m_e r_e \omega^2$, $\omega_n$ is the natural frequency of the system, and F is the force applied to Mm.

Figure 5:
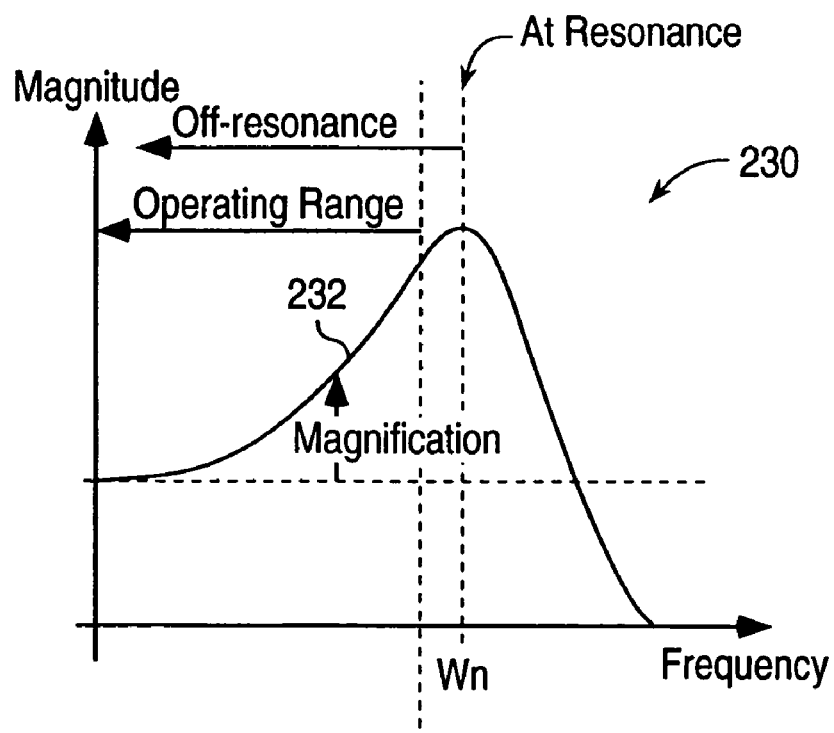
FIG. 5 is a graph illustrating a frequency vs. magnitude response for the inertial forces output by the system of FIG. 4.

An important result of the relationships presented above is that the system designed can be tuned to achieve a desired magnification of forces. FIG. 5 is a graph 230 illustrating a frequency response of the tactile feedback system. The magnitude of vibrations felt by the user increases as the frequency of operation increases toward the resonant frequency (natural frequency) $\omega_n$. The resonant frequency (natural frequency, $\omega_n$) of the system is the frequency at which the minimum energy is required to achieve the highest magnitude output, where the system resonates to the greatest degree from an input. The magnitude response thus reaches a peak at the resonant frequency as frequency is increased, then drops steeply when frequency is increased past the resonant frequency.

The suspended system described above is driving a dual mass with a spring in series where the system can be operated in the off-resonance frequency range, i.e., the motor is intentionally being operated on the positive slope 232 of the mass and spring resonance curve. The resonance frequency of the system can be set above the desired range of harmonic operation, where the motor is operated off-resonance in the region below the natural frequency $\omega_n$ to achieve an increase in magnitude of vibrations. The system can also be operated at the resonance frequency, or above the resonance frequency, to achieve the magnification of forces.

Once the desired operating range of frequencies is known, the shape of the curve in FIG. 5 can be adjusted to a desired shape by picking different compliance characteristics of the compliant elements (spring 208) so that the operating range is around the resonant frequency of the system and within the magnification range of the curve. Since the housing and motor masses do not change, this tuning of the system is likely remain effective over an extended period of time.

Figure 6:
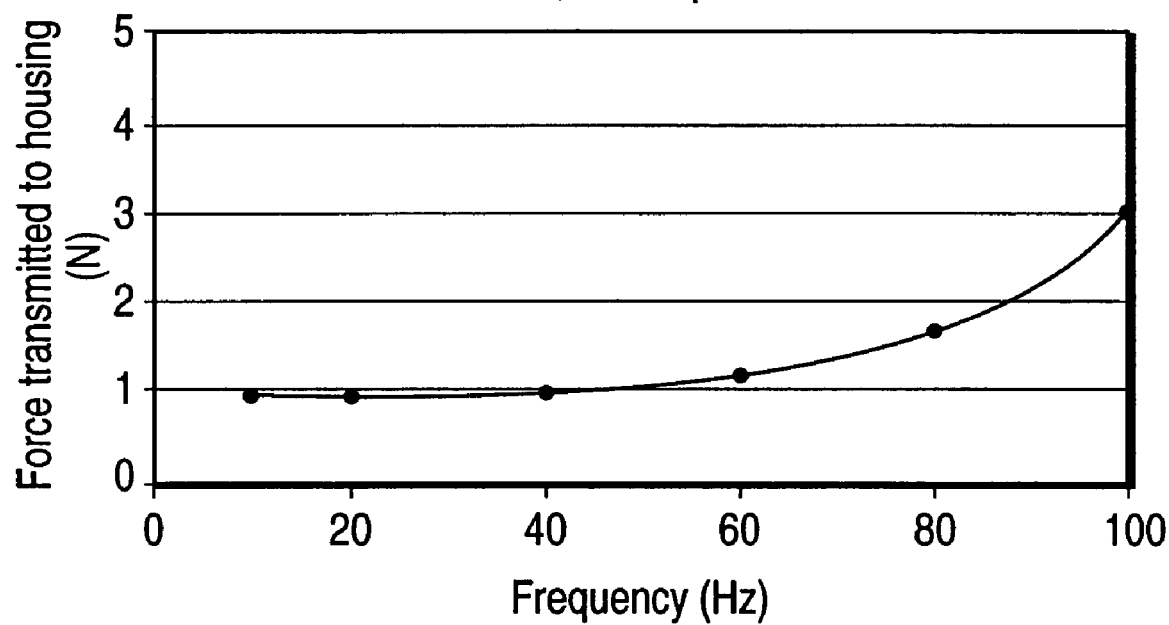
FIG. 6 is a graph illustrating forces transmitted to the housing of an interface device of the present invention.

For instance, a motor and mass driven harmonically at 80 Hz would transmit 1 Newton to the housing when hard mounted with little or no compliance. Adding a suspension spring with a stiffness in the order of 17,000 N/m between that same motor and housing boosts the output force to nearly two times the hard-mounted level to 2 N. FIG. 6 is a graph 240 showing the magnification of periodic force (e.g. vibration) magnitude to the housing expected from such a coupled dual mass system for a frequency range of 0 to 100 Hz.

In summary, greater magnitude inertial forces can be achieved from the same power, mass, eccentricity, and actuator by selectively adding compliance to the actuator's mounting within the product. This may be a simple helical spring, foam pads, rubber grommet, leaf spring clip, or some other low-cost part that locates and suspends the actuator relative to the device housing.

In some embodiments, the damper 210 can be included in the system to further tune the shape of the curve in FIG. 5. If, for example, the magnitude of inertial forces is too high at the end of the operating frequency range (e.g. a spike), damping can reduce the magnitude of the peak of the magnitude response to a smoothed desired level. The damping factor b can be increased with foam or other damping material as desired. The addition of damping does not change the natural frequency of the system.

Figure 7:
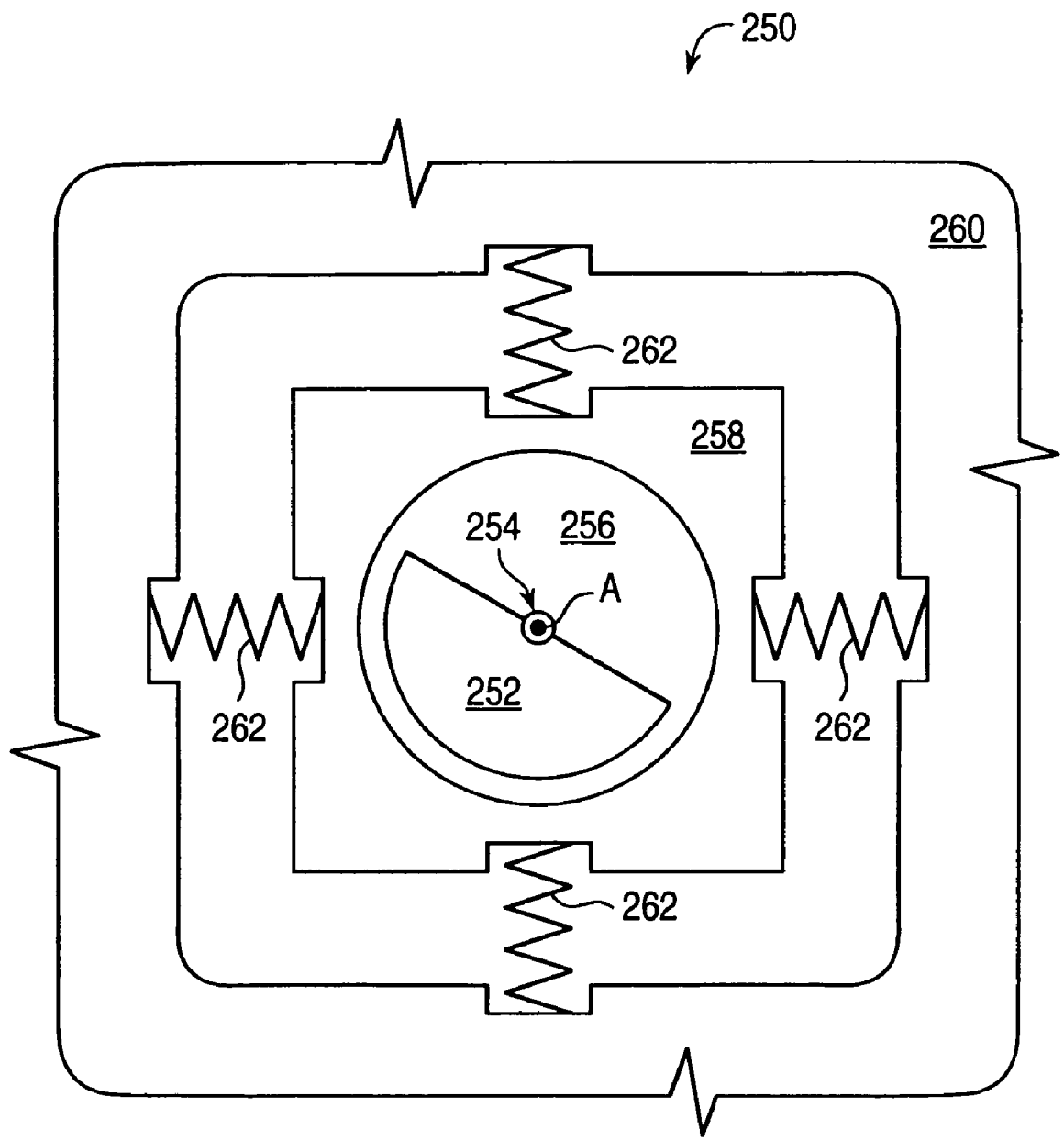
FIG. 7 is a diagram illustrating one embodiment of the interface device of the present invention.

FIG. 7 shows a diagrammatic illustration of an embodiment 250 of an inertial tactile feedback system of the present invention, where an eccentric mass 252 or other inertial device (i.e. a linkage or other mechanism for providing mass, e.g., a linkage providing one particular vibration response in one direction and a different response in the other direction of rotation) is mounted on the rotatable shaft 254 of an actuator 256 such as a motor. The mass 252 rotates about an axis A. The motor housing is rigidly coupled to a motor bracket 258, and the motor bracket 258 is compliantly coupled to the device housing 260 (suspended) by one or more spring elements 262. The device housing is held or otherwise physically contacted by the user.

The spring elements 262 can take a variety of different forms, including helical springs, leaf springs, compliant members, diaphragms, or other types of elements. The compliance of the springs have been chosen such that the resonance frequency of the springs is above the range of frequencies which the motor 256 will be controlled to output. The springs are also chosen with the proper spring constant k to achieve an operating range below the natural frequency of the system and provide the resulting magnified inertial forces. Preferably, the spring elements are made of a material that does not change its compliance radically with changes in temperature or other environmental characteristics, e.g. suitable materials are metal or certain types of plastic (but typically not foam or like materials).

In the emodiment shown, there are four spring elements 262 coupling the motor 256 to the housing 260. In other embodiments, the number of spring elements can differ, e.g. one or many spring elements can be used. For example, in one embodiment, a diaphragm can connect the motor to the housing, where the diaphragm provides the compliance in approximately one degree of freedom for the motor.

In some embodiments, damping may be added to the system. Damping can be added in a variety of ways, including providing a compliant piece or other damping material in parallel with one or more spring members or other compliant mechanism (e.g. a piece of foam in contact with a spring member), providing a viscous material such as oil on the rotating shaft of the motor, or other ways known in the mechanical arts.

Figure 8:
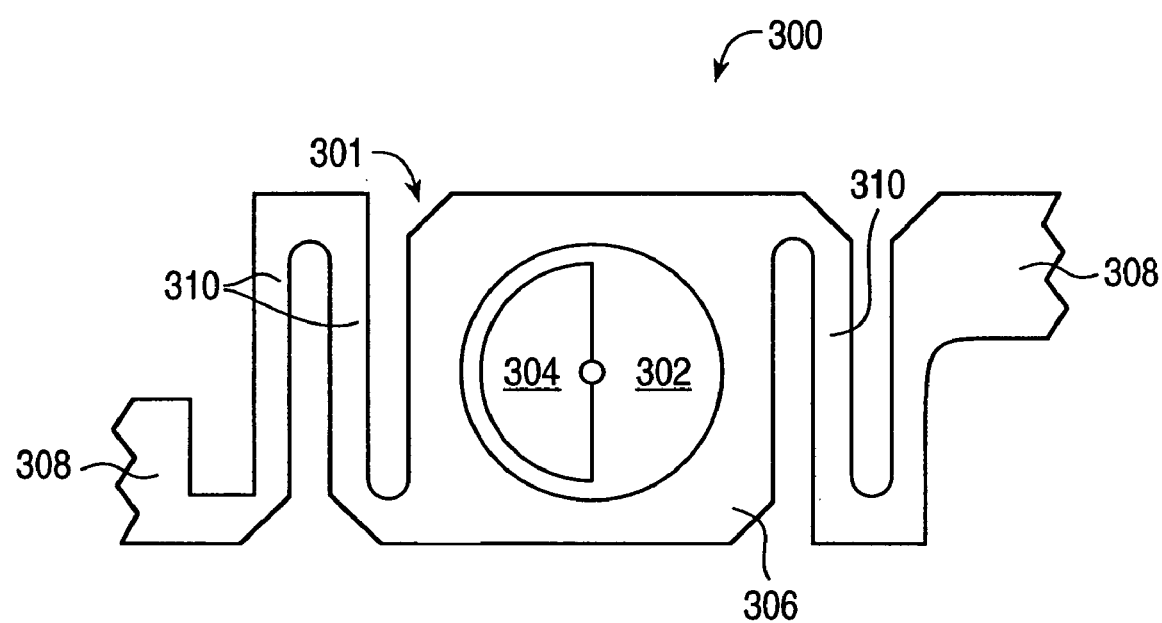
FIG. 8 is a front view of a specific embodiment of the actuator and compliance system of the present invention.

FIG. 8 illustrates an example of a specific embodiment 300 of the invention, in which a compliance mechanism 301 is formed as a single piece with the housing of the device. A rotary motor 302 having an eccentric mass 304 is rigidly coupled to a motor bracket 306. The motor bracket 306 is coupled to the housing 308 of the device by spring beams 310, where the spring beams 310 are preferably integrated in the same unitary material as the bracket 306 and the housing 308. This allows the entire suspension, including beams 310 and bracket 306, to be molded as a single piece with the housing 308, thus greatly reducing manufacturing and assembly cost. The housing 308, bracket 306, and spring beams 310 can be made of a plastic having the desired compliance, for example. The spring beams 310 can be designed at the proper width and length to provide the desired spring constant and amplification range to inertial forces produced by the actuator. Furthermore, flex joints can be provided at desired locations on the beams 310, the joints having the necessary thickness to provide the desired spring constant.

Figure 9:
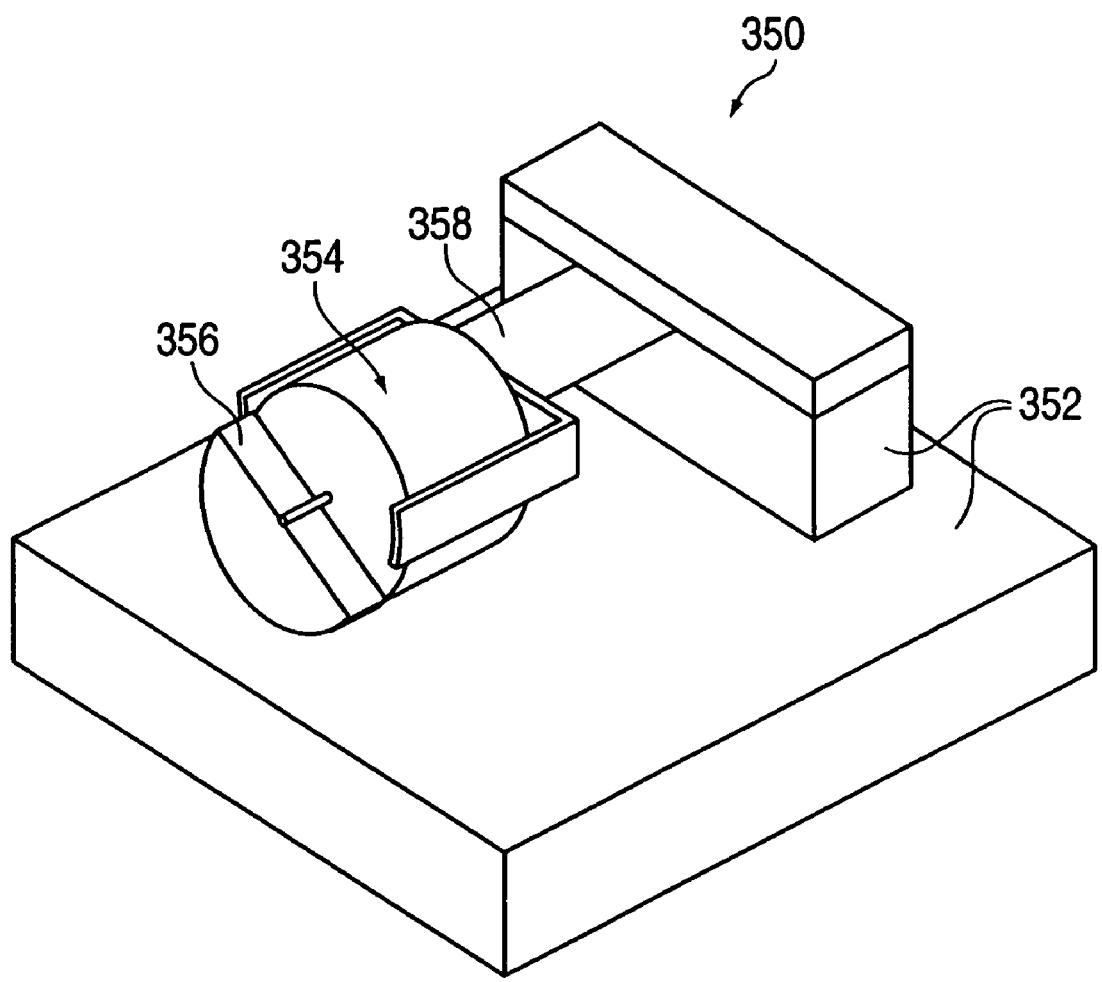
FIG. 9 is a perspective view of a prototype system of the present invention for providing high magnitude inertial forces.

Another embodiment 350 is shown in FIG. 9. A base mass 352 is approximately matched to the mass of a gamepad controller. A motor 354 having an ERM 356 is coupled to the base 352 by a leaf spring 358 to provide the compliance between motor and housing. This prototype was placed on a foam layer so that an accelerometer attached to the base could be used to measure the transmitted force. In the test, the base was rotated vertically so that the motor vibrations acted against the leaf spring's most compliant axis.

As expected, when the motor was harmonically driven with a sine function, the magnitude of the housing acceleration could be maximized by altering the leaf spring suspension stiffness. For instance, by tuning spring stiffness to maximize peak output force at 80 Hz resonance, it was possible to boost the acceleration measured on the base everywhere below that frequency, thus providing higher-magnitude vibrations. This process was repeated for several natural frequencies and the results were consistent. Different types of springs (such as springs having a better or more linear compliance) can be used in other embodiments.

In summary, the eccentric mass selection/design needs to be based on the dynamics of the product as a whole in order to take fill advantage of a given actuator. Mass and motor torque choices depend on the relative masses of the suspended motor and the housing. Tuning the spring for the desired magnification effect can be analogous to impedance matching in an electric circuit. In addition, harmonic driving extends the bandwidth of the motor/eccentric assemblies used in inertial tactile feedback gamepads or similar devices, but output falls off with increasing drive frequency. The two degree of freedom dual mass system proposed naturally compensates for this attenuation.

The above embodiments show that output inertial forces can be magnified by compliantly suspending the motor relative to the housing. This allows embodiments having low power requirements to be much more feasible, since inertial forces can be output and magnified to the desired magnitude even when a relatively small amount of power is provided to rotate (or otherwise activate) the motor or other actuator.

The present invention can also be used with other types of actuators besides rotary motors, including linear actuators, solenoids, voice coil actuators, etc. For example, a linear actuator can include a moving element that oscillates back and forth approximately linearly to provide inertial force sensations such as vibrations.

The above invention of suspending a motor relative to the housing is discussed in terms of the bi-direction control using a harmonic drive. The invention can also be applied to embodiments which drive a motor unidirectionally. For example, gamepad embodiments can use the invention to provide greater strength vibrations for an ERM rotating in one direction. In the above-described embodiment that allows independent magnitude and frequency control for a unidirectionally-driven ERM, pulses are provided to drive the actuator instead of a forcing function. Since the ultimate motion of the mass is oscillatory and/or rotational, a suspension of the present invention tuned to the mass and other characteristics of the system can magnify the inertial forces output based on the oscillatory and/or rotational motion.

While this invention has been described in terms of several preferred embodiments, it is contemplated that alterations, permutations and equivalents thereof will become apparent to those skilled in the art upon a reading of the specification and study of the drawings. For example, many different types of interface devices can be used with the control features of the present invention, including gamepads, remote controls, joystick handles, mice, steering wheels, grips, knobs, or other manipulandums or devices. Furthermore, certain terminology has been used for the purposes of descriptive clarity, and not to limit the present invention. It is therefore intended that the following appended claims include alterations, permutations, and equivalents as fall within the true spirit and scope of the present invention.

What is claimed is:

1. A device, comprising:
   a housing;
   an actuator coupled to said housing, the actuator configured to receive a control signal, the control signal based on data values associated with at least one of an event associated with an external environment and a function of an external apparatus, the actuator configured to produce an inertial force based on the control signal, the inertial force having a first component associated with a frequency range and a second component associated with a frequency range different from the frequency range of the first component; and
   a compliant suspension coupled to said actuator and said housing, said compliant suspension member having a compliance such that said compliant suspension is configured to magnify the first component of the inertial force, the compliant suspension configured to impart the magnified inertial force including the magnified first component of the inertial force to the housing.

2. The device of claim 1, wherein the inertial force is operative to impart a periodic vibration to said housing.

3. The device of claim 1, wherein said compliant suspension includes at least one spring member.

4. The device of claim 1, wherein said compliant suspension is a leaf spring.

5. The device of claim 1, said compliant suspension including at least one spring member, wherein the at least one spring member includes at least one spring beam coupled to said housing, said spring beam configured to flex, the compliance of the spring member being defined at least in part by the flex of the spring beam.

6. The device of claim 1, wherein said compliant suspension includes a diaphragm.

7. The device of claim 1, further comprising a damping member coupled between said actuator and said housing, said damping member configured to reduce a peak magnitude of a periodic vibration imparted to said housing by the inertial force.

8. The device of claim 1, further comprising a damping member including a foam, the damping member being coupled between said actuator and said housing, said damping member configured to reduce a peak magnitude of a periodic vibration imparted to said housing by the inertial force.

9. The device of claim 1, wherein said actuator is coupled to a bracket, said bracket being coupled to said housing by said compliant suspension.

10. The device of claim 1, wherein said control signal is received from a video game console and said external environment is a game running on said console, said control signal being based on an event in the game.

11. The device of claim 1, wherein said actuator is a rotary motor and said compliant suspension is coupled between a housing of said motor and said housing of said device.

12. The device of claim 11, wherein an eccentric mass is coupled to a rotating shaft of said motor and is configured to output the inertial force.

13. The device of claim 1, wherein said actuator is a linear motor including an oscillating element and is configured to output the inertial force.

14. The device of claim 1, wherein said control signal is provided by a controller locally coupled to the device.

15. The device of claim 14, wherein said local controller is a microprocessor, and said microprocessor is configured to receive data from a host computer.

16. The device of claim 1, wherein said control signal is output by a host computer such that said host computer directly controls the inertial force.

17. A method, comprising:
   transmitting an input signal from a haptic feedback device, the haptic feedback device including a housing, an actuator coupled to the housing and a compliant suspension coupled to the actuator and the housing;
   receiving at the actuator a control signal, the control signal based on data values associated with at least one of an event occurring in an external environment and a function of an external apparatus, the event associated with the input signal;
   outputting an inertial force via the actuator, the inertial force being based on the control signal, the inertial force having a first component associated with a frequency range and a second component associated with a frequency range different from the frequency range of the first component; and transmitting a vibration associated with the inertial force to the housing via the compliant suspension, the compliant suspension having a compliance such that the compliant suspension is configured to magnify the first component of the inertial force.

18. The method of claim 17, further comprising reducing a peak magnitude of the inertial force using a damper.

19. The method of claim 17, wherein the receiving the control signal includes receiving the control signal from a controller locally coupled to the haptic feedback device.

20. The method of claim 17, wherein the receiving the control signal includes receiving the control signal at the actuator directly from a host computer such that the host computer directly controls the output of the vibration.

21. A device, comprising:
a housing;
a manipulandum coupled to said housing;
a sensor configured to detect a manipulation of said manipulandum, the sensor further configured to output sensor data, the sensor data based on the detected manipulation;
an actuator coupled to said housing, said actuator configured to receive a control signal based on at least one of an event occurring in an external environment and a function associated with an external apparatus, the actuator further configured to output an inertial force based on the control signal, the inertial force having a first component associated with a frequency range and a second component associated with a frequency range different from the frequency range of the first component; and
a compliant member coupled to said actuator and said housing, said complaint member having a compliance such that said compliant member is configured to magnify the first component and the second component of the inertial force, the compliant member configured to impart the inertial force, including the magnified first component of the inertial force and the magnified second component of the inertial force to the housing.

22. The device of claim 21, wherein the magnification of the second component of the inertial force is different from the magnification of the first component of the inertial force.

23. The device of claim 21, wherein the magnification of the second component of the inertial force is substantially zero.

24. The device of claim 21, the actuator being a first actuator, the compliant member being a first compliant member, further comprising:
a second actuator configured to produce an inertial vibration; and
a second complaint member coupled to said second actuator and said housing, the second compliant member configured to magnify the inertial vibrations.

25. A processor-readable medium storing code representing instructions to cause a processor to perform a process, the code comprising code to:
transmit an input signal from a haptic feedback device, the haptic feedback device including a housing, an actuator coupled to the housing and a compliant suspension coupled to the actuator and the housing;
receive at the actuator a control signal, the control signal based on data values associated with at least one of an event occurring in an external environment and a function of an external apparatus, the event associated with the input signal;
output an inertial force via the actuator, the inertial force being based on the control signal, the inertial force having a first component associated with a frequency range and a second component associated with a frequency range different from the frequency range of the first component; and
transmit a vibration associated with the inertial force to the housing via the compliant suspension, the compliant suspension having a compliance such that the compliant suspension is configured to magnify the first component of the inertial force.

26. The processor-readable medium of claim 25, the code further comprising code to reduce a peak magnitude of the inertial force using a damper.

27. The processor-readable medium of claim 25, wherein the code to receive the control signal includes code to receive the control signal from a controller locally coupled to the haptic feedback device.

28. The processor-readable medium of claim 25, wherein the code to receive the control signal includes code to receive the control signal at the actuator directly from a host computer such that the host computer directly controls the output of the vibration.

* * * * *